US011228397B2

(12) United States Patent
Yamada (10) Patent No.: US 11,228,397 B2
(45) Date of Patent: Jan. 18, 2022

(54) WIRELESS TRANSMISSION SYSTEM, WIRELESS TRANSMISSION DEVICE, WIRELESS TRANSMISSION METHOD, AND WIRELESS TRANSMISSION PROGRAM

(71) Applicant: NEC CORPORATION, Tokyo (JP)

(72) Inventor: Kenji Yamada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/851,818

(22) Filed: Apr. 17, 2020

(65) Prior Publication Data

US 2020/0343998 A1 Oct. 29, 2020

(30) Foreign Application Priority Data

Apr. 26, 2019 (JP) .............................. JP2019-086119

(51) Int. Cl.
*H04L 1/00* (2006.01)
(52) U.S. Cl.
CPC .......... *H04L 1/0061* (2013.01); *H04L 1/0041* (2013.01); *H04L 1/0045* (2013.01); *H04L 1/0057* (2013.01); *H04L 1/0083* (2013.01)
(58) Field of Classification Search
CPC ... H04L 1/0041; H04L 1/0045; H04L 1/0057; H04L 1/0061; H04L 1/0083; H04L 1/1852; H04L 1/1854
See application file for complete search history.

(56) References Cited

U.S. PATENT DOCUMENTS

| 2008/0008256 | A1* | 1/2008 | Matsumoto | ............. H04L 5/023 375/260 |
| 2011/0007729 | A1* | 1/2011 | Nogami | ................ H04L 1/1854 370/342 |
| 2011/0103290 | A1* | 5/2011 | Suzuki | ................ H04L 27/2602 370/312 |

FOREIGN PATENT DOCUMENTS

WO 2018/179922 A1 10/2018

* cited by examiner

*Primary Examiner* — Shelly A Chase
(74) *Attorney, Agent, or Firm* — Sughrue Mion, PLLC (57) ABSTRACT

A wireless transmission system includes a first wireless transmission device and a second wireless transmission device. The first wireless transmission device sets multiplex data to at least one predetermined bit contained in an input first packet and thereby generates a second packet containing the multiplex data, and transmits the second packet to the second wireless transmission device. The second wireless transmission device receives the second packet from the first wireless transmission device, performs error detection on the second packet, and when the error detection ends normally, extracts the multiplex data from the at least one predetermined bit in the second packet.

8 Claims, 6 Drawing Sheets

WIRELESS TRANSMISSION SYSTEM, WIRELESS TRANSMISSION DEVICE, WIRELESS TRANSMISSION METHOD, AND WIRELESS TRANSMISSION PROGRAM

INCORPORATION BY REFERENCE

This application is based upon and claims the benefit of priority from Japanese patent application No. 2019-086119, filed on Apr. 26, 2019, the disclosure of which is incorporated herein in its entirety by reference.

TECHNICAL FIELD

The present disclosure relates to a wireless transmission system, a wireless transmission device, a wireless transmission method, and a wireless transmission program.

BACKGROUND ART

An approach to achieve high capacity is needed to deal with the recent rapid increase in traffic, and a technique to increase the transmission capacity has been studied (e.g., International Patent Publication No. WO2018/179922).

To increase the transmission capacity, it is necessary to change the operating frequency of a wireless transmission device or increase the bandwidth of a wireless channel for transmitting data. However, in the case of changing the operating frequency or increasing the bandwidth of a wireless channel, it is not possible to easily increase the transmission capacity due to a limitation to device performance and a legal limitation such as a radio law.

SUMMARY

One of objects of the present disclosure is to provide a wireless transmission system, a wireless transmission device, a wireless transmission method, and a wireless transmission program capable of increasing the transmission capacity without changing the operating frequency or increasing the bandwidth.

A wireless transmission system according to the present disclosure includes a first wireless transmission device and a second wireless transmission device, wherein the first wireless transmission device sets multiplex data to at least one predetermined bit contained in an input first packet and thereby generates a second packet containing the multiplex data, and transmits the second packet to the second wireless transmission device, and the second wireless transmission device receives the second packet from the first wireless transmission device, performs error detection on the second packet, and when the error detection ends normally, extracts the multiplex data from the at least one predetermined bit in the second packet.

A wireless transmission device according to the present disclosure includes a receiving unit configured to receive a first packet from another wireless transmission device, a detection unit configured to perform error detection on the first packet, and an extraction unit configured to extract multiplex data from at least one predetermined bit in the first packet when the error detection ends normally.

A wireless transmission method according to the present disclosure includes receiving a packet from another wireless transmission device, performing error detection on the packet, and extracting multiplex data from at least one predetermined bit in the packet when the error detection ends normally.

BRIEF DESCRIPTION OF DRAWINGS

The above and other aspects, features and advantages of the present disclosure will become more apparent from the following description of certain exemplary embodiments when taken in conjunction with the accompanying drawings, in which.

EMBODIMENTS

Example embodiments of the present disclosure will be described hereinafter with reference to the drawings. Note that the following description and the attached drawings are appropriately shortened and simplified to clarify the explanation. In the figures, the identical reference symbols denote identical structural elements and the redundant explanation thereof is omitted.

First Example Embodiment

Figure 1:
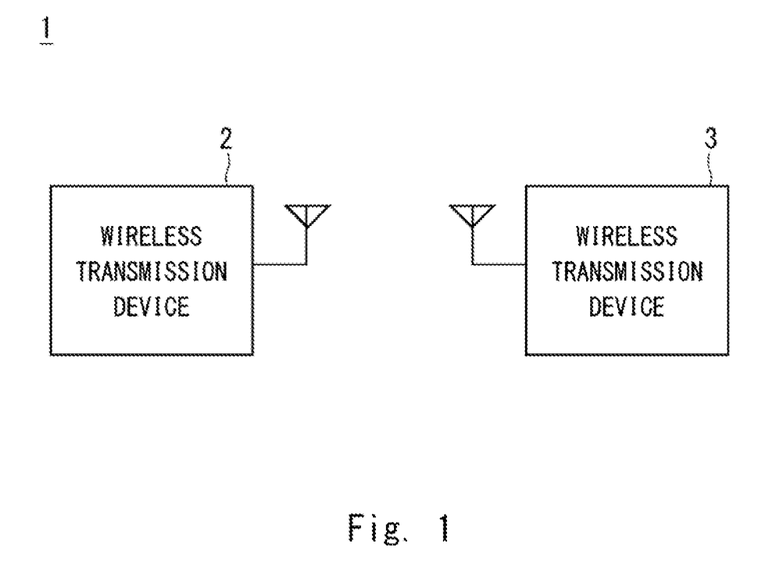
FIG. 1 is a view showing a configuration example of a wireless transmission system according to a first example embodiment.

A wireless transmission system 1 according to a first example embodiment is described hereinafter with reference to FIG. 1. FIG. 1 is a view showing a configuration example of a wireless transmission system according to the first example embodiment. The wireless transmission system 1 includes a wireless transmission device 2 and a wireless transmission device 3. In this example embodiment, the wireless transmission device 2 is described as being a wireless transmission device at the transmitting end, and the wireless transmission device 3 is described as being a wireless transmission device at the receiving end; however, the wireless transmission device 3 may be a wireless transmission device at the transmitting end, and the wireless transmission device 2 may be a wireless transmission device at the receiving end.

The wireless transmission device 2 sets multiplex data to at least one predetermined bit contained in an input first packet and thereby generates a second packet containing the multiplex data, and transmits the second packet to the wireless transmission device 3.

The wireless transmission device 3 receives the second packet from the wireless transmission device 2, performs error detection on the second packet, and when the error detection ends normally, extracts the multiplex data from the at least one predetermined bit in the second packet.

As described above, the wireless transmission device 2 sets multiplex data to a predetermined bit contained in the input first packet and transmits the second packet containing the multiplex data. The wireless transmission device 3 performs error detection on the second packet, and when the error detection ends normally, extracts the multiplex data from the predetermined bit in the second packet. In this manner, the wireless transmission system 1 including the wireless transmission device 2 and the wireless transmission device 3 can transmit and receive multiplex data without changing the operating frequency or increasing the bandwidth. The wireless transmission system 1 can thereby increase the transmission capacity without changing the operating frequency or increasing the bandwidth.

Second Example Embodiment

A second example embodiment is described hereinafter. The second example embodiment is a specific version of the first example embodiment.

<Configuration Example of Wireless Transmission System>

Figure 2:
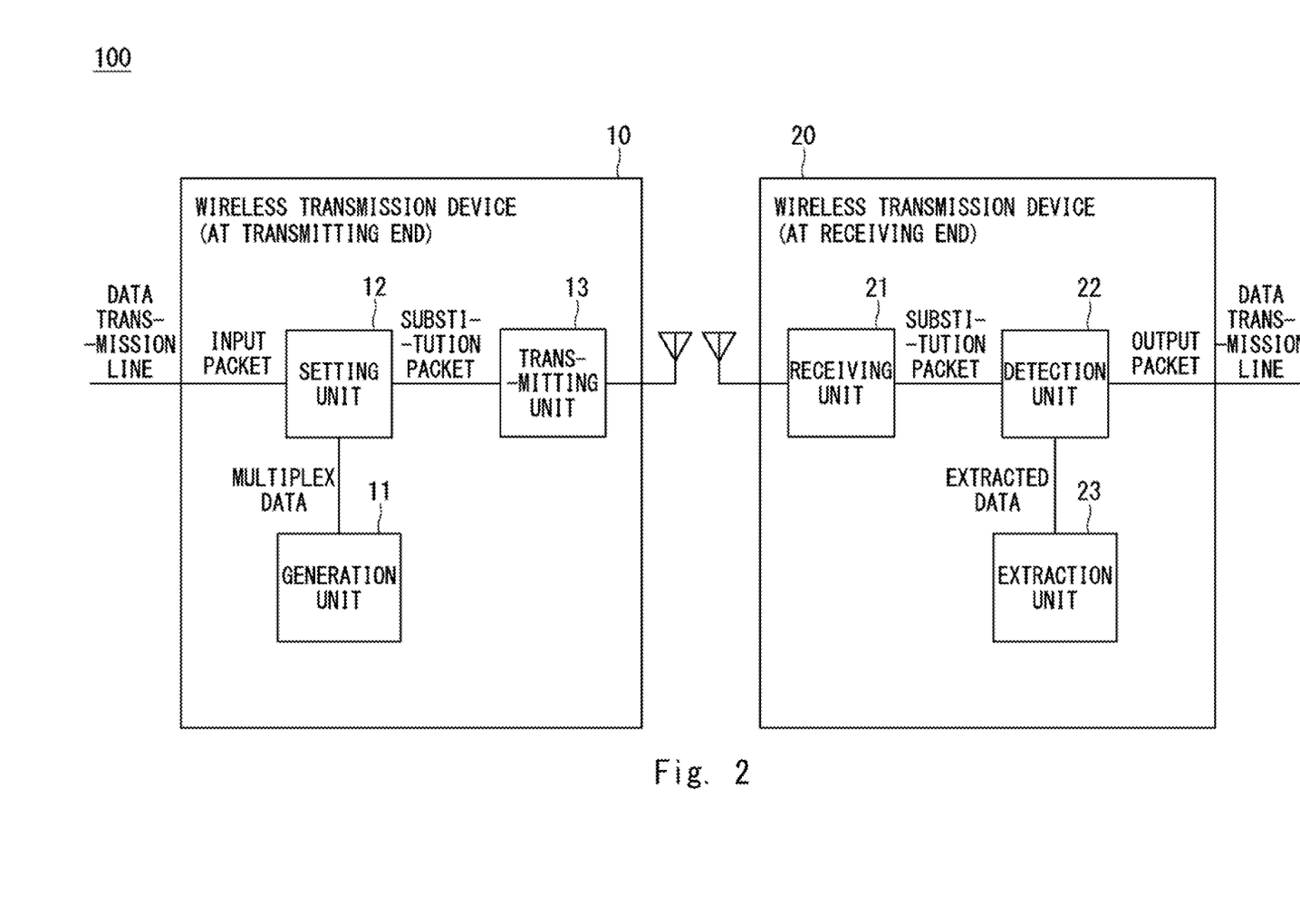
FIG. 2 is a view showing a configuration example of a wireless transmission system according to a second example embodiment.

A configuration example of a wireless transmission system 100 according to the second example embodiment is described hereinafter with reference to FIG. 2. FIG. 2 is a view showing a configuration example of the wireless transmission system according to the second example embodiment.

The wireless transmission system 100 includes a wireless transmission device 10 and a wireless transmission device 20. The wireless transmission device 10 is a wireless transmission device at the transmitting end. The wireless transmission device 20 is a wireless transmission device at the receiving end. The wireless transmission device 10 may function as a wireless transmission device at the receiving end, and the wireless transmission device 20 may function as a wireless transmission device at the transmitting end. Specifically, the wireless transmission device 10 may include the elements of the wireless transmission device 20, which are described later, and the wireless transmission device 20 may include the elements of the wireless transmission device 10, which are described later.

The wireless transmission device 10 receives an input packet from a data transmission line. The data transmission line may be wired, wireless, or a combination of wired and wireless. The wireless transmission device 10 sets multiplex data to a specific bit (predetermined bit) contained in the input packet and thereby generates a substitution packet containing the multiplex data, and transmits the substitution packet to the wireless transmission device 20 through a wireless channel.

The wireless transmission device 20 receives the substitution packet from the wireless transmission device 10 through the wireless channel. The wireless transmission device 20 performs error detection on the received substitution packet. The error detection may be error detection by an error detecting method using FCS (Frame Check Sequence) of an ETH (Ethernet) packet. Note that, in the following description, the error detection is described as error detection by an error detecting method using FCS in some cases.

When the error detection on the substitution packet ends normally, the wireless transmission device 20 extracts the multiplex data set in the wireless transmission device 10 from the specific bit in the substitution packet. Further, when the specific bit is inverted when the multiplex data is set in the wireless transmission device 10, the wireless transmission device 20 outputs an output packet in which the specific bit in the substitution packet is inverted and the extracted multiplex data to the subsequent stage through the data transmission line.

<Configuration Example of Wireless Transmission Device at Transmitting End>

A configuration example of the wireless transmission device 10, which is a wireless transmission device at the transmitting end, is described hereinbelow. The wireless transmission device 10 includes a generation unit 11, a setting unit 12, and a transmitting unit 13.

The generation unit 11 generates multiplex data to be set to an input packet to the setting unit 12, and outputs the generated multiplex data to the setting unit 12.

The setting unit 12 receives (inputs) the input packet through the data transmission line. The setting unit 12 sets the multiplex data generated by the generation unit 11 to the specific bit contained in the input packet. The substitution packet includes an FCS field to which a CRC (Cyclic Redundancy Check) value calculated for the input packet before the setting unit 12 sets the multiplex data is set. In other words, the setting unit 12 generates the substitution packet by substituting the multiplex data for the specific bit contained in the input packet without changing the CRC value set to the FCS field. The setting unit 12 generates the substitution packet containing the multiplex data and outputs it to the transmitting unit 13. In the following description, the specific bit is described as the first bit (one bit) in the payload of the input packet. Note that the specific bit may be any bit of the payload as long as the wireless transmission device 20, which is the wireless transmission device at the receiving end, recognizes the position of the specific bit.

The transmitting unit 13 transmits the substitution packet to the wireless transmission device 20, which is the wireless transmission device at the receiving end, through the wireless channel.

<Configuration Example of Wireless Transmission Device at Receiving End>

A configuration example of the wireless transmission device 20, which is a wireless transmission device at the receiving end, is described hereinbelow. The wireless transmission device 20 includes a receiving unit 21, a detection unit 22, and an extraction unit 23.

The receiving unit 21 receives the substitution packet transmitted from the wireless transmission device 10 through the wireless channel.

The detection unit 22 performs error detection on the substitution packet received by the receiving unit 21. For example, the detection unit 22 may calculate a CRC value for a filed different from the FCS field contained in the substitution packet, and perform error detection based on the calculated CRC value and the CRC value set to the FCS field contained in the substitution packet.

The detection unit 22 determines whether the error detection ends normally or not. When the error detection ends normally, the detection unit 22 notifies the extraction unit 23, which is described later, that the error detection has ended normally, and transmits (outputs) the substitution packet received by the receiving unit 21 to the extraction unit 23.

When, on the other hand, the error detection on the substitution packet does not end normally, the detection unit 22 inverts the first bit, which is the specific bit, of the payload of the substitution packet and performs the error detection again. By this inversion, when the first bit of the payload of the substitution packet is 0 (zero), it is replaced with 1, and when the first bit is 1, it is replaced with 0 (zero).

When the error detection on the substitution packet in which the first bit of the payload of the substitution packet is inverted ends normally, the detection unit 22 notifies the extraction unit 23 that the error detection has ended normally, and transmits (outputs) the substitution packet received by the receiving unit 21 to the extraction unit 23.

When, on the other hand, the error detection on the substitution packet in which the first bit of the payload of the substitution packet is inverted does not end normally, the detection unit 22 discards the substitution packet received by the receiving unit 21.

When the error detection on the substitution packet ends normally, the detection unit 22 receives the multiplex data from the extraction unit 23. The detection unit 22 sends the received multiplex data and the substitution packet where the error detection ends normally as an output packet to the subsequent stage through the data transmission line.

Specifically, when the error detection on the substitution packet received by the receiving unit 21 ends normally, the detection unit 22 transmits the substitution packet received by the receiving unit 21 as the output packet. When the error detection on the substitution packet in which the specific bit in the substitution packet received by the receiving unit 21 is inverted ends normally, the detection unit 22 transmits the substitution packet in which the specific bit is inverted as the output packet to the subsequent stage.

When the error detection on the substitution packet ends normally, the extraction unit 23 extracts the multiplex data from the specific bit in the substitution packet. The extraction unit 23 transmits (outputs) the extracted data to the detection unit 22.

<Operation Example of Wireless Transmission System>

Figure 3:
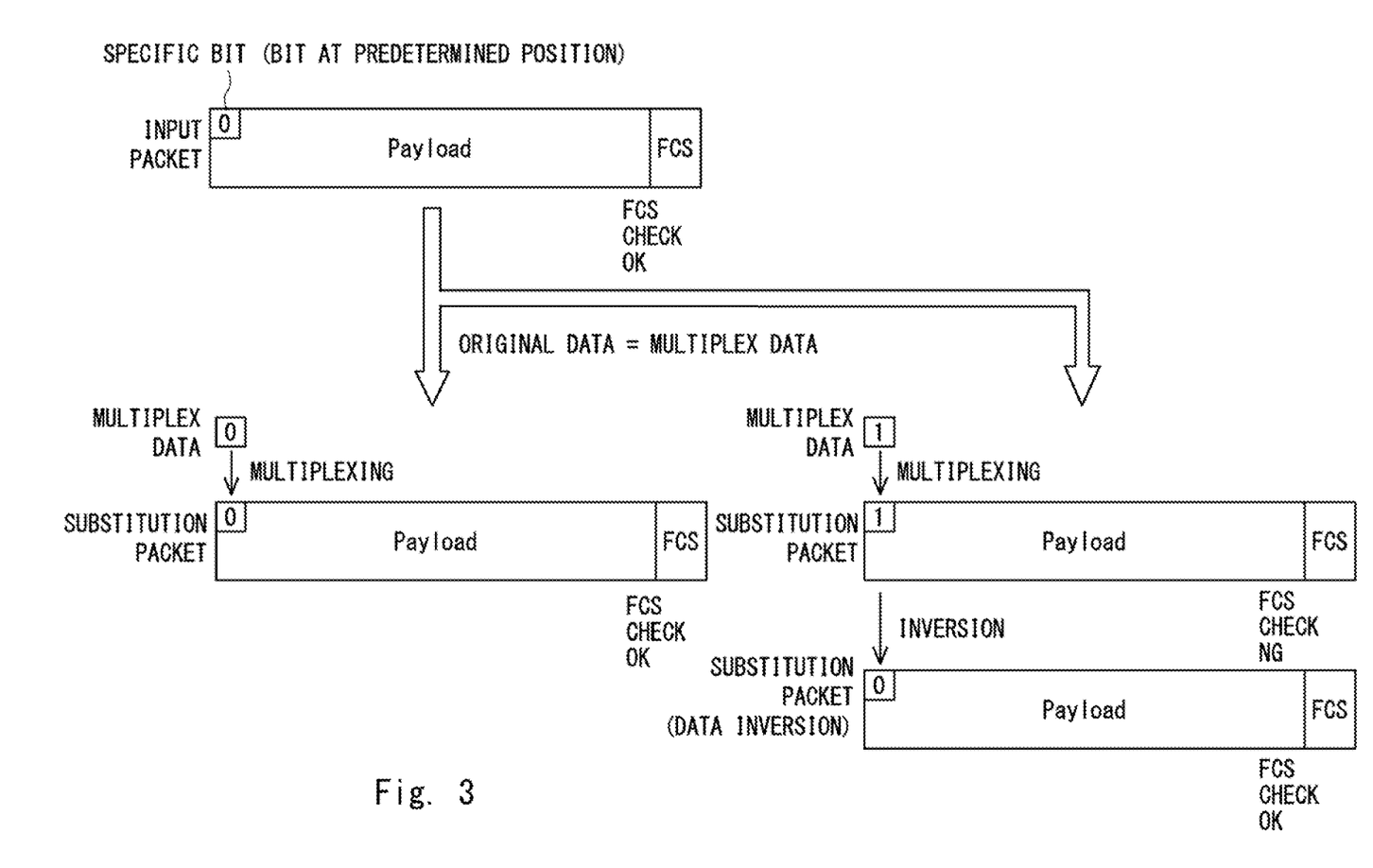
FIG. 3 is a view illustrating an operation example of the wireless transmission system according to the second example embodiment.
Figure 4:
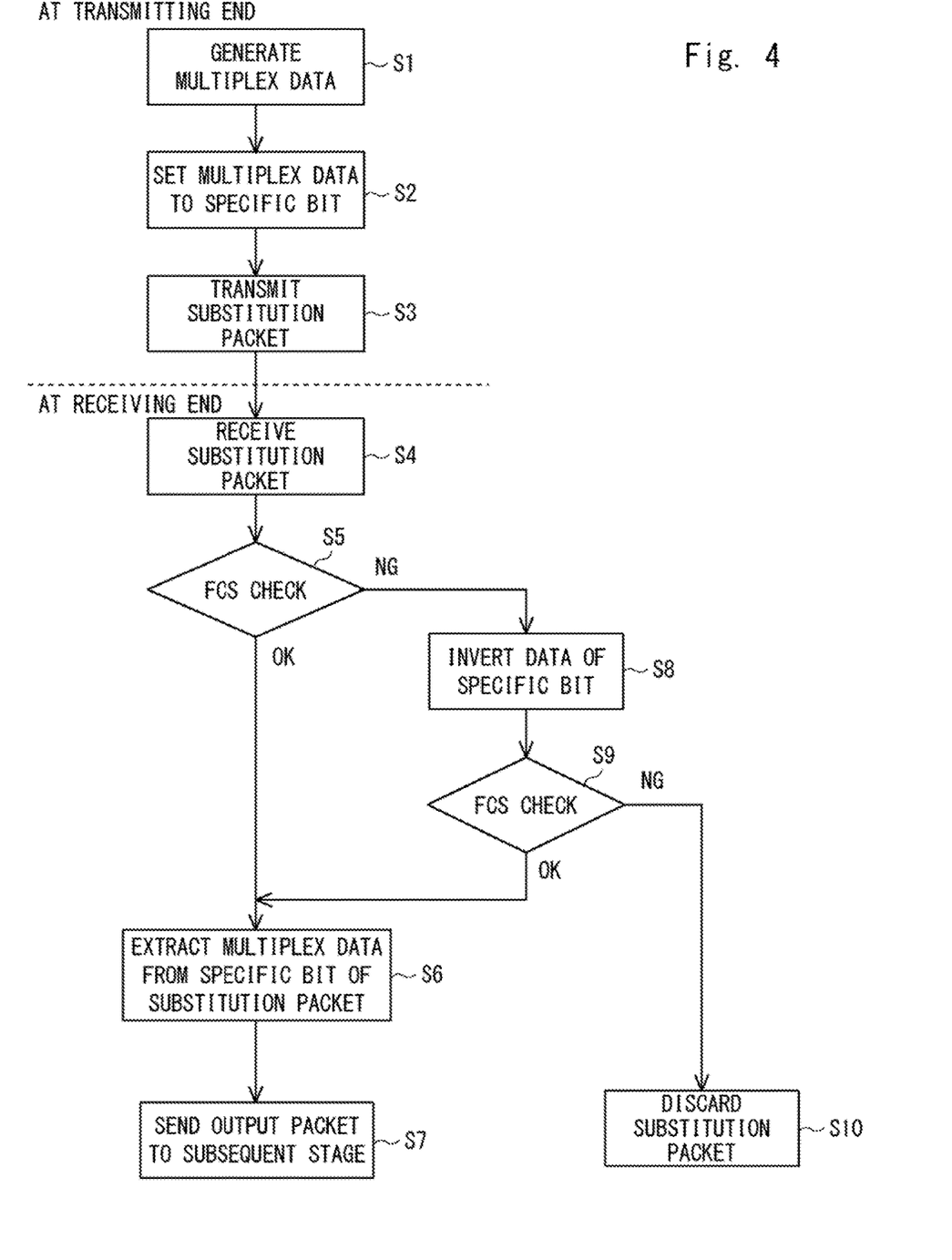
FIG. 4 is a flowchart showing an operation example of the wireless transmission system according to the second example embodiment.

An operation example of the wireless transmission system 100 is described hereinafter with reference to FIGS. 3 and 4. FIG. 3 is a view illustrating an operation example of the wireless transmission system according to the second example embodiment. FIG. 4 is a flowchart showing an operation example of the wireless transmission system according to the second example embodiment.

Referring first to FIG. 3, FIG. 3 is a view to illustrate setting the multiplex data in the wireless transmission device 10 and extracting the multiplex data in the wireless transmission device 20.

The upper part of FIG. 3 shows an input packet in the case where the first bit of the payload of the input packet is the specific bit, and 0 is set to this specific bit. The input packet contains the payload and the FCS field. Although the input packet also contains a preamble and the like, they are not shown in this figure because they are not directly relevant to the present disclosure. In the upper part of FIG. 3, the CRC value calculated for the input packet and the CRC value set to the FCS field match, and therefore the FCS check results in normal.

The lower left part of FIG. 3 shows a substitution packet in the case where the multiplex data is 0 (zero), which is the same value as the specific bit. The generation unit 11 generates the multiplex data, and the setting unit 12 sets the generated multiplex data to the specific bit of the input packet and thereby generates the substitution packet. In the lower left part of FIG. 3, because the value of the specific bit and the value of the multiplex data are both 0 (zero), the FCS check results in normal even when the multiplex data is set. Since the error detection on the substitution packet performed by the detection unit 22 results in normal (the FCS check results in normal), the extraction unit 23 extracts the multiplex data from the specific bit of the substitution packet.

The lower right part of FIG. 3 shows a substitution packet in the case where the multiplex data is 1, which is a different value from the specific bit of the input packet. The generation unit 11 generates the multiplex data, and the setting unit 12 sets the generated multiplex data to the specific bit of the input packet and thereby generates the substitution packet. In the lower right part of FIG. 3, because the value of the multiplex data is 1, which is different from the value of the specific bit of the input packet, if the multiplex data is set, the FCS check does not result in normal. Since the error detection on the substitution packet does not result in normal (the FCS check does not result in normal), the detection unit 22 inverts the value of the specific bit in the substitution packet to 0 (zero).

The detection unit 22 performs the error detection again on the substitution packet in which the specific bit is inverted. In this case, because the value of the specific bit and the value of the multiplex data match, the error detection on the substitution packet performed by the detection unit 22 results in normal. The extraction unit 23 determines that the multiplex data has been set to the specific bit in the substitution packet received by the receiving unit 21, and extracts the multiplex data from the specific bit in the substitution packet received by the receiving unit 21.

As described above, when the FCS check on the substitution packet performed by the detection unit 22 results in normal, the value of the specific bit contained in the input packet and the value of the multiplex data match. Thus, the extraction unit 23 determines that the substitution packet on which the error detection is performed is a correct packet, and extracts the multiplex data from the substitution packet.

When the FCS check performed by the detection unit 22 does not result in normal, the value of the specific bit contained in the input packet and the value of the multiplex data do not match, or a bit different from the specific bit is incorrect. Thus, the detection unit 22 inverts the specific bit in the substitution packet and performs the FCS check again.

When the FCS recheck results in OK (normal), because the value of the specific bit contained in the input packet and the value of the multiplex data do not match, the detection unit 22 determines that a packet in which the specific bit in the substitution packet is inverted is a correct packet. The extraction unit 23 extracts the multiplex data from the substitution packet before the specific bit is inverted in the substitution packet. In other words, the extraction unit 23 extracts the multiplex data in the substitution packet received by the receiving unit 21.

When, on the other hand, the FCS recheck results in NG (the FCS recheck does not result in normal), because a bit different from the specific bit in the substitution packet is incorrect, the detection unit 22 determines that the true FCS check results in NG (the true FCS check does not result in normal), and performs processing such as discarding the packet on the substitution packet.

A flowchart showing an operation example of the wireless transmission system 100 is described hereinafter with reference to FIG. 4. Steps S1 to S3 shown in FIG. 4 are the operations performed in the wireless transmission device 10, which is the wireless transmission device at the transmitting end. Steps S4 to S10 shown in FIG. 4 are the operations performed in the wireless transmission device 20, which is the wireless transmission device at the receiving end.

The generation unit 11 generates multiplex data (Step S1), and the setting unit 12 sets the multiplex data to a specific bit in an input packet input through the data transmission line and thereby generates a substitution packet (Step S2).

The transmitting unit 13 transmits the substitution packet to which the multiplex data is set to the wireless transmission device 20 through the wireless channel (Step S3).

The receiving unit 21 receives the substitution packet transmitted from the wireless transmission device 10 through the wireless channel (Step S4), and the detection unit 22 performs FCS check as error detection on the received substitution packet and determines whether the check result is normal or not (Step S5).

When the detection unit 22 determines that the FCS check result is normal (OK in Step S5), the extraction unit 23 extracts, in Step S6, the multiplex data from the specific bit in the substitution packet received in Step S4. The extraction unit 23 transmits the extracted multiplex data to the detection unit 22.

The detection unit 22 sends the multiplex data extracted by the extraction unit 23 and the substitution packet whose FCS check result is determined as normal to the subsequent packet (Step S7).

In Step S5, when the detection unit 22 determines that the FCS check result is not normal (NG in Step S5), the detection unit 22 inverts data of the specific bit in the substitution packet (Step S8).

In Step S8, the detection unit 22 performs FCS check as error detection on the substitution packet in which the specific bit is inverted, and determines whether the check result is normal or not (Step S9).

When the detection unit 22 determines that the FCS check result is normal (OK in Step S9), Steps S6 and S7 are performed. Note that, in Step S6 that is performed when the result in Step S9 is OK, the extraction unit 23 may extract data in which the specific bit that has been inverted in Step S8 is inverted again as the multiplex data. Further, in Step S7 that is performed when the result in Step S9 is OK, the detection unit 22 sends the multiplex data extracted by the extraction unit 23 and the substitution packet whose FCS check result in Step S9 is determined as normal to the subsequent packet. Specifically, in this case, the detection unit 22 sends the substitution packet in which data of the specific bit is inverted to the subsequent packet.

In Step S9, when the detection unit 22 determines that the FCS check result is not normal (NG in Step S9), the detection unit 22 discards the substitution packet (Step S10).

As described above, the wireless transmission device 10 sets multiplex data to a specific bit contained in an input packet and transmits a substitution packet containing the multiplex data. The wireless transmission device 20 performs error detection on the substitution packet, and when the error detection ends normally, extracts the multiplex data from the specific bit in the substitution packet. In this manner, in the wireless transmission system 100, by multiplexing a plurality of information on a specific bit by using FCS check of an ETH packet or the like, for example, it is possible to transmit and receive multiplex data without changing the operating frequency or increasing the bandwidth. Thus, the wireless transmission system 100 according to the second example embodiment can increase the transmission capacity without changing the operating frequency or increasing the bandwidth.

Further, as described above, the wireless transmission device 20 can receive a plurality of information multiplexed on a specific bit by using a general error detection function such as FCS check of an ETH packet, for example. Specifically, the wireless transmission system 100 according to the second example embodiment can increase the transmission capacity by applying a general error detection function to a typical wireless transmission system. Therefore, the wireless transmission system 100 according to the second example embodiment can be implemented by design with fewer changes from a typical wireless transmission system.

Modified Example 1

Figure 5:
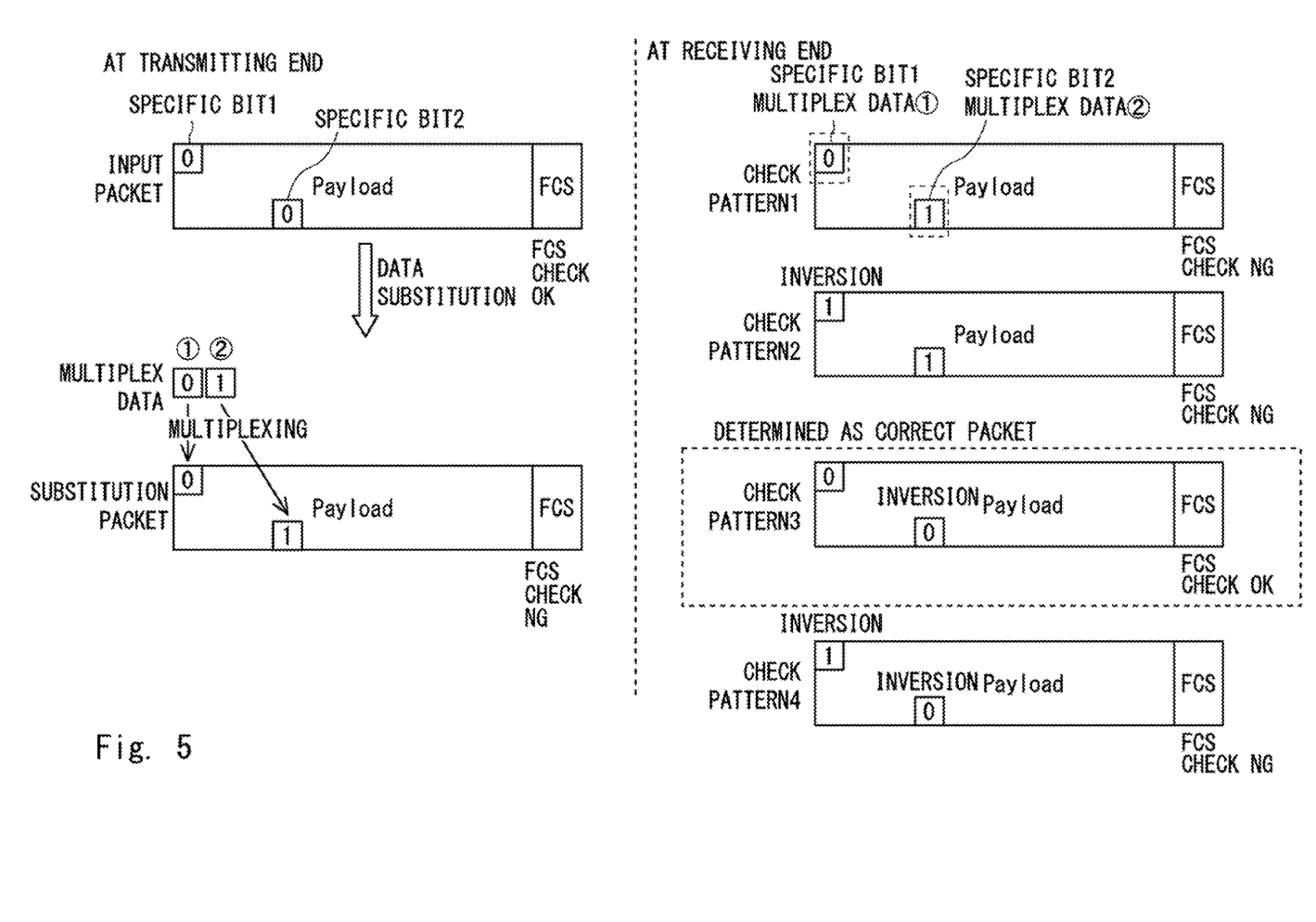
FIG. 5 is a view illustrating an operation example of a wireless transmission system according to a modified example of the second example embodiment.

Although the case where the specific bit (predetermined bit) is 1 bit is described in the second example embodiment, the specific bit may be 2 or more bits. The case where the specific bit is 2 bits is described hereinafter with reference to FIG. 5. FIG. 5 is a view illustrating an operation example of a wireless transmission system according to a modified example of the second example embodiment.

The left part of FIG. 5 illustrates the operation at the transmitting end, and the right part illustrates the operation at the receiving end. The upper left part of FIG. 5 shows an input packet that is input to the setting unit 12, and specific bits 1 and 2 are set as 0 (zero) in the payload of the input packet. In this case, FCS check, which is error detection on the input packet, results in normal (OK).

The lower left part of FIG. 5 shows a substitution packet and two multiplex data generated by the generation unit 11, and it is assumed that the value of first multiplex data is 0 (zero), and the value of second multiplex data is 1. The setting unit 12 sets the first multiplex data to the specific bit 1, and sets the second multiplex data to the specific bit 2, and thereby generates the substitution packet. Because the setting unit 12 changes only the specific bits in the payload of the input packet and does not change the FCS field, FCS check, which is error detection, in this case does not result in normal (results in NG). The transmitting unit 13 transmits the substitution packet shown in the lower left part to the wireless transmission device 20 through the wireless channel.

The right part of FIG. 5 shows error detection performed by the detection unit 22. When there are plurality of specific bits, the detection unit 22 first performs FCS check as error detection on the substitution packet received by the receiving unit 21 (check pattern 1 in FIG. 5).

When the FCS check does not result in normal for the check pattern 1 in FIG. 5, the detection unit 22 performs FCS check in an arbitrary order for check patterns 2 to 4. When there is a check pattern whose FCS check result is normal, the extraction unit 23 determines that the multiplex data has been set to the specific bits in the substitution packet received by the receiving unit 21, and extracts the multiplex data from the specific bits in the substitution packet received by the receiving unit 21. Note that, in this case, because the FCS check is not needed for the remaining check patterns, the FCS check is not performed on the remaining check patterns.

On the other hand, when the FCS check does not result in normal also for the check patterns 2 to 4, the detection unit 22 determines that a bit different from the specific bits in the substitution packet is incorrect, and discards the substitution packet.

The check patterns 2 to 4 are inversion patterns that invert any one or more bits of the specific bits. Specifically, the detection unit 22 performs the FCS check on different inversion patterns one after another until the FCS check on any of the inversion patterns ends normally or until the FCS check on all of the inversion patterns is done.

In sum, when there are a plurality of specific bits (predetermined bits), the detection unit 22 has the following configuration.

The detection unit 22 performs error detection on the received substitution packet. When this error detection ends normally, the extraction unit 23 extracts multiplex data from the specific bits in the substitution packet.

When, on the other hand, the error detection on the received substitution packet does not end normally, the detection unit 22 repeatedly inverts any one or more bits of the specific bits in the substitution packet and performs error detection again. The detection unit 22 repeats the processing of inverting a bit and performing error detection again until the error detection ends normally or until the error detection is done for all inversion patterns that invert any one or more bits of the specific bits in the substitution packet.

When the error detection on the substitution packet in which any one or more bits of the specific bits in the substitution packet is inverted ends normally, the extraction unit 23 extracts the multiplex data from the specific bits in the received substitution packet.

When, on the other hand, the error detection for all inversion patterns that invert a specific bit in the received substitution packet does not end normally, the detection unit 22 discards the substitution packet.

As described above, it is possible to deal with the case where there are a plurality of specific bits (predetermined bits) by increasing the number of check patterns, and the same effects as in the second embodiment can be obtained.

Modified Example 2

In the second embodiment, the detection unit 22 may perform error correction in addition to the error detection. The detection unit 22 may perform error correction by FEC (Forward Error Correction), for example. It is thereby possible to assume that an error does not occur in the substitution packet received by the receiving unit 21, and therefore Steps S9 and S10 in the flowchart shown in FIG. 4 can be omitted. Note that the extraction unit 23 may extract data in which the specific bit that has been inverted in Step S8 of FIG. 4 is inverted again as the multiplex data.

Other Embodiments

Figure 6:
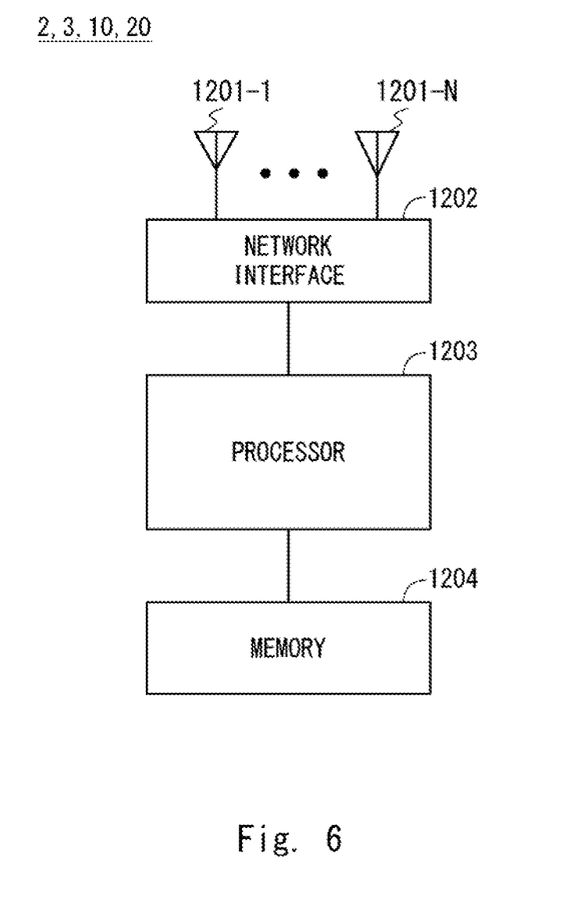
FIG. 6 is a block diagram showing an example of the hardware configuration of a computer (information processing device) capable of implementing a wireless transmission device or the like according to each of the example embodiments of the present disclosure.

The wireless transmission devices 2, 3, 10 and 20 (which are referred to hereinafter as the wireless transmission device 2 and the like) according to the embodiments described above may have the following hardware configuration. FIG. 6 is a block diagram illustrating the hardware configuration of a computer (information processing device) capable of implementing a wireless transmission device according to each of the example embodiments of the present disclosure.

Referring to FIG. 6, the wireless transmission device 2 and the like include a plurality of antennas 1201-1 to 1201-N, a network interface 1202, a processor 1203, and a memory 1204. The plurality of antennas 1201-1 to 1201-N and the network interface 1202 are used to communicate with another wireless communication device including a plurality of terminals. The network interface 1202 may include a network interface card (NIC) conforming to IEEE (Institute of Electrical and Electronics Engineers) 802.11 series, IEEE 802.3 series and the like, for example.

The processor 1203 reads and runs software (computer program) from the memory 1204 and thereby executes processing of the wireless transmission device 2 and the like that is described with reference to the flowcharts in the exemplary embodiments described above. The processor 1203 may be a microprocessor, an MPU (Micro Processing Unit) or a CPU (Central Processing Unit), for example. The processor 1203 may include a plurality of processors.

The memory 1204 is a combination of a volatile memory and a nonvolatile memory. The memory 1204 may include a storage that is placed apart from the processor 1203. In this case, the processor 1203 may access the memory 1204 through an I/O interface, which is not shown.

In the example of FIG. 6, the memory 1204 is used to store a group of software modules. The processor 1203 reads and runs the group of software modules from the memory 1204 and can thereby perform the processing of the wireless transmission device 2 and the like described in the above exemplary embodiments.

As described with reference to FIG. 6, each of processors included in the wireless transmission device 2 and the like runs one or a plurality of programs including a group of instructions for causing a computer to perform the algorithms described using the drawings.

The programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present disclosure is not limited to the above-described embodiments and can be modified as appropriate without departing from the spirit and scope of the present disclosure. Further, the present disclosure may be implemented by combining the above-described exemplary embodiments with one another.

The whole or part of the exemplary embodiments disclosed above can be described as, but not limited to, the following supplementary notes.
(Supplementary Note 1)
A wireless transmission system comprising:
a first wireless transmission device; and
a second wireless transmission device, wherein
the first wireless transmission device sets multiplex data to at least one predetermined bit contained in an input first packet and thereby generates a second packet containing the multiplex data, and transmits the second packet to the second wireless transmission device, and
the second wireless transmission device receives the second packet from the first wireless transmission device, performs error detection on the second packet, and when the error detection ends normally, extracts the multiplex data from the at least one predetermined bit in the second packet.
(Supplementary Note 2)
The wireless transmission system according to Supplementary Note 1, wherein, when the error detection does not end normally, the second wireless transmission device performs the error detection again on a third packet in which any one or more bits of the at least one predetermined bit in the second packet are inverted.

(Supplementary Note 3)

The wireless transmission system according to Supplementary Note 2, wherein, when the error detection on the third packet ends normally, the second wireless transmission device extracts the multiplex data from the at least one predetermined bit in the second packet.

(Supplementary Note 4)

The wireless transmission system according to Supplementary Note 2 or 3, wherein, when the error detection on packets generated by all inversion patterns that invert any one or more bits of the at least one predetermined bit in the second packet does not end normally, the second wireless transmission device discards the second packet.

(Supplementary Note 5)

The wireless transmission system according to Supplementary Note 1, wherein, when the error detection does not end normally, the second wireless transmission device performs error correction on the second packet, and extracts the multiplex data from the at least one predetermined bit in the second packet on which the error correction has been performed.

(Supplementary Note 6)

The wireless transmission system according to any one of Supplementary Notes 1 to 5, wherein the at least one predetermined bit is a bit contained in a payload in the first packet and the second packet.

(Supplementary Note 7)

A wireless transmission device comprising:
a receiving unit configured to receive a first packet from another wireless transmission device;
a detection unit configured to perform error detection on the first packet; and
an extraction unit configured to extract multiplex data from at least one predetermined bit in the first packet when the error detection ends normally.

(Supplementary Note 8)

The wireless transmission system according to Supplementary Note 7, wherein the first packet is a packet in which the multiplex data generated by the another wireless transmission device is set to the at least one predetermined bit in a second packet input to the another wireless transmission device.

(Supplementary Note 9)

A wireless transmission method comprising:
receiving a packet from another wireless transmission device;
performing error detection on the packet; and
extracting multiplex data from at least one predetermined bit in the packet when the error detection ends normally.

(Supplementary Note 10)

A wireless transmission device comprising:
a generation unit configured to generate multiplex data;
a setting unit configured to set the multiplex data to at least one predetermined bit contained in an input first packet and thereby generates a second packet containing the multiplex data; and
a transmitting unit configured to transmit the second packet to another wireless transmission device.

(Supplementary Note 11)

A wireless transmission program causing a computer to execute:
receiving a packet from another wireless transmission device;
performing error detection on the packet; and
extracting multiplex data from at least one predetermined bit in the packet when the error detection ends normally.

(Supplementary Note 12)

A wireless transmission method comprising:
generating multiplex data;
setting the multiplex data to at least one predetermined bit contained in an input first packet and thereby generating a second packet containing the multiplex data; and
transmitting the second packet to another wireless transmission device.

(Supplementary Note 13)

A wireless transmission program causing a computer to execute:
generating multiplex data;
setting the multiplex data to at least one predetermined bit contained in an input first packet and thereby generating a second packet containing the multiplex data; and
transmitting the second packet to another wireless transmission device.

According to the present disclosure, it is possible to provide a wireless transmission system, a wireless transmission device, a wireless transmission method, and a wireless transmission program capable of increasing the transmission capacity without changing the operating frequency or increasing the bandwidth.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

What is claimed is:

1. A wireless transmission system comprising:
a first wireless transmission device; and
a second wireless transmission device, wherein the first wireless transmission device sets multiplex data to at least one predetermined bit contained in an input first packet and thereby generates a second packet containing the multiplex data, and transmits the second packet to the second wireless transmission device, and
the second wireless transmission device receives the second packet from the first wireless transmission device, performs error detection on the second packet, and when the error detection ends normally, extracts the multiplex data from the at least one predetermined bit in the second packet,
wherein the at least one predetermined bit is a bit contained in a payload in the first packet and the second packet.

2. The wireless transmission system according to claim 1, wherein, when the error detection does not end normally, the second wireless transmission device performs the error detection again on a third packet in which any one or more bits of the at least one predetermined bit in the second packet are inverted.

3. The wireless transmission system according to claim 2, wherein, when the error detection on the third packet ends normally, the second wireless transmission device extracts the multiplex data from the at least one predetermined bit in the second packet.

4. The wireless transmission system according to claim 2, wherein, when the error detection on packets generated by all inversion patterns that invert any one or more bits of the at least one predetermined bit in the second packet does not end normally, the second wireless transmission device discards the second packet.

5. The wireless transmission system according to claim 1, wherein, when the error detection does not end normally, the second wireless transmission device performs error correction on the second packet, and extracts the multiplex data from the at least one predetermined bit in the second packet on which the error correction has been performed.

6. A wireless transmission device comprising:
a receiving unit configured to receive a first packet from another wireless transmission device;
a detection unit configured to perform error detection on the first packet; and
an extraction unit configured to extract multiplex data from at least one predetermined bit in the first packet when the error detection ends normally,
wherein the at least one predetermined bit is a bit contained in a payload in the first packet.

7. The wireless transmission system according to claim 6, wherein the first packet is a packet in which the multiplex data generated by the another wireless transmission device is set to the at least one predetermined bit in a second packet input to the another wireless transmission device.

8. A wireless transmission method comprising:
receiving a packet from another wireless transmission device;
performing error detection on the packet; and
extracting multiplex data from at least one predetermined bit in the packet when the error detection ends normally,
wherein the at least one predetermined bit is a bit contained in a payload in the packet.

* * * * *